United States Patent
Wang

(10) Patent No.: US 6,719,440 B1
(45) Date of Patent: Apr. 13, 2004

(54) STRUCTURE OF FORMATIVE LIGHTING FIXTURES

(76) Inventor: Jessica Wang, 16F-3, No. 70, Sec. 2, Tun-Hua South Road, Taipei (TW), 106

(*) Notice: Subject to any disclaimer, the term of this patent is extended or adjusted under 35 U.S.C. 154(b) by 0 days.

(21) Appl. No.: 10/350,024

(22) Filed: Jan. 24, 2003

(51) Int. Cl.⁷ .................................................. F21S 6/00
(52) U.S. Cl. ...................... 362/249; 362/252; 362/123; 362/124; 362/806
(58) Field of Search ................................ 362/806, 249, 362/252, 227, 124, 123, 807, 808; 428/7, 8; 211/1.51, 181.1, 26

(56) References Cited

U.S. PATENT DOCUMENTS

| | | | | |
|---|---|---|---|---|
| 4,364,102 A | * | 12/1982 | Huppert et al. ............. | 362/123 |
| 5,850,927 A | * | 12/1998 | Pan ........................... | 211/181.1 |
| 5,955,156 A | * | 9/1999 | Hermanson .................. | 428/7 |
| 6,394,282 B1 | * | 5/2002 | Pan ........................... | 211/1.51 |
| 6,478,164 B1 | * | 11/2002 | Pan ........................... | 211/1.51 |
| 6,652,927 B1 | * | 11/2003 | Chen .......................... | 428/7 |

* cited by examiner

Primary Examiner—Sandra O'Shea
Assistant Examiner—Hargobind S. Sawhney
(74) Attorney, Agent, or Firm—Bacon & Thomas, PLLC

(57) ABSTRACT

An improved structure of formative lighting fixtures comprises a frame, a plurality of bulbs, and a refracting layer, in which the frame is formed by gathering a plurality of rods and profiled in a specific contour, the bulbs are installed on the frame to serve for lighting ornaments, and the rods on the frame are coated with a refracting layer of a transparent material. A formative lighting fixture so constructed can offer a dazzling effect to thereby reduce bulb amount and facilitate production.

4 Claims, 5 Drawing Sheets

STRUCTURE OF FORMATIVE LIGHTING FIXTURES

FIELD OF THE INVENTION

This invention relates generally to the structure of formative lighting fixtures, more particularly, it relates specifically to an improved structure of formative lighting fixtures which is formed to create a dazzling effect through a refracting layer so that the lighting fixtures could be made easier and the amount of bulb could be reduced.

BACKGROUND OF THE INVENTION

In order to heighten the festival atmosphere, the formative lighting fixtures are usually structured in specific shapes. Referring to FIG. 1, a conventional structure of formative lighting fixtures is constructed with a frame (A) and a plurality of lighting tubes (B), in which the frame (A) could be a skeleton having a specific appearance comprised of a plurality of rods, while the lighting tubes (B) are tangled on and along the entire skeleton such that the frame (A) could serve as a lighting ornament.

In a conventional formative lighting fixture, the bulb in a lighting tube is heated to emanate light, however, the light is either not refracted or refracted in a poor quality through the tube wall. Therefore, this invention is proposed to enhance the whole dazzling phenomenon with fewer bulbs to thereby save power and energy compared with the conventional.

SUMMARY OF THE INVENTION

The primary objective of this invention is to provide an improved structure of formative lighting fixtures for eliminating the defects as mentioned in the conventional.

In order to realize abovesaid objective, the structure of formative lighting fixtures of this invention is constructed with a frame, a plurality of bulbs, and a refracting layer, in which the frame could be formed by gathering a plurality of rods and profiled in a specific contour (like a Christmas tree, a Santa Claus, or an elk, etc.), then, the bulbs are installed on the frame to serve for lighting ornaments, and finally, the rods on the frame are coated with a refracting layer of a transparent material (such as acrylic, PVC, or glass).

The advantages and features of this invention could be summarized as the following:

1. By coating a refracting layer on the frame, the light from the bulbs could be refracted to produce a dazzling effect;
2. Lowering cost and saving energy by reducing the bulb's amount is possible; and
3. As the refracting layer is formed by coating a fused material on the frame, therefore, the job can be done easily and rapidly independent of the formation of the frame.

For more detailed information regarding advantages or features of this invention, at least an example of preferred embodiment will be fully described below with reference to the annexed drawings.

BRIEF DESCRIPTION OF THE DRAWINGS

The related drawings in connection with the detailed description of this invention to be made later are described briefly as follows, in which.

DETAILED DESCRIPTION OF THE INVENTION

The detailed description of some preferred embodiments is made below with reference to the enclosed drawings.

Figure 1:
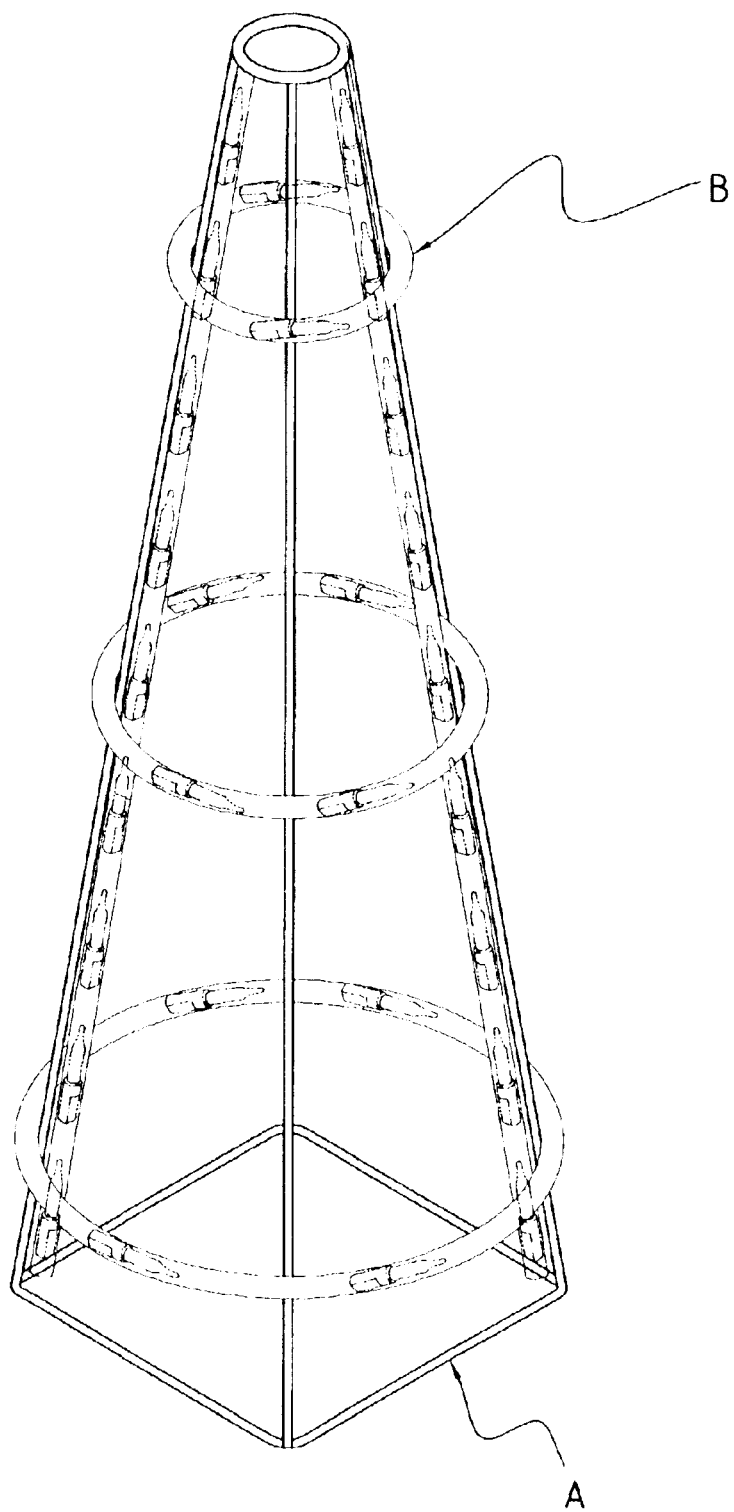
FIG. 1 shows the three-dimensional structure of a conventional formative lighting fixture.
Figure 2:
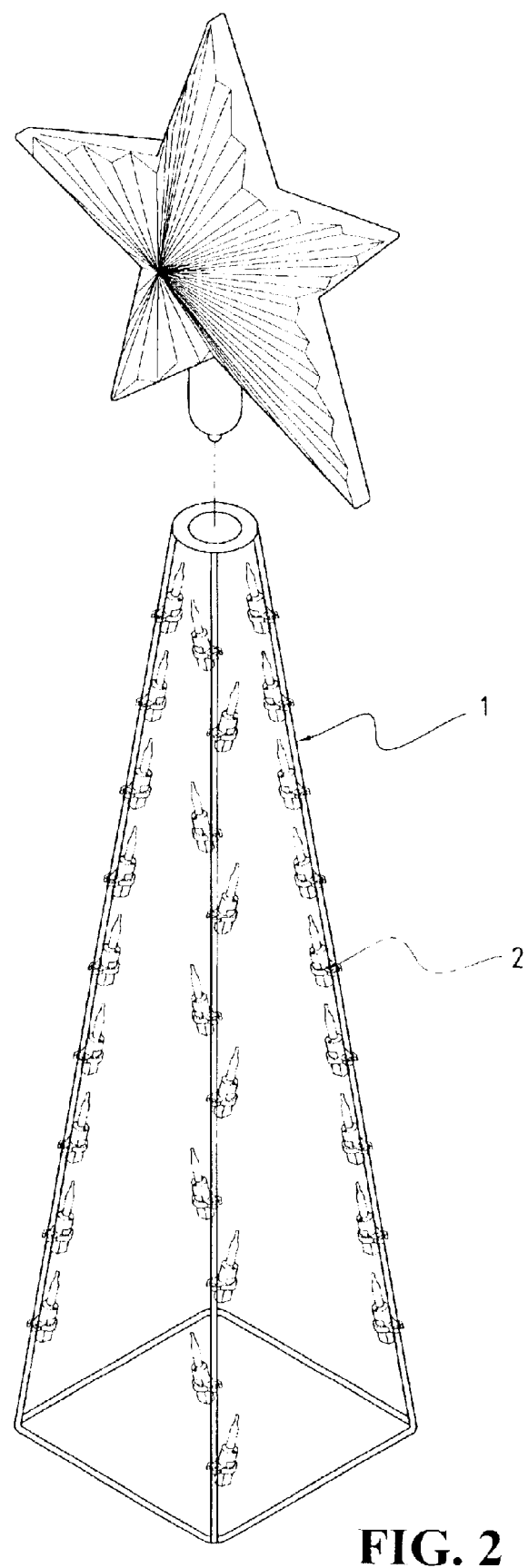
FIG. 2 shows the three-dimensional structure of a lighting fixture of this invention without coating a refracting layer.
Figure 3:
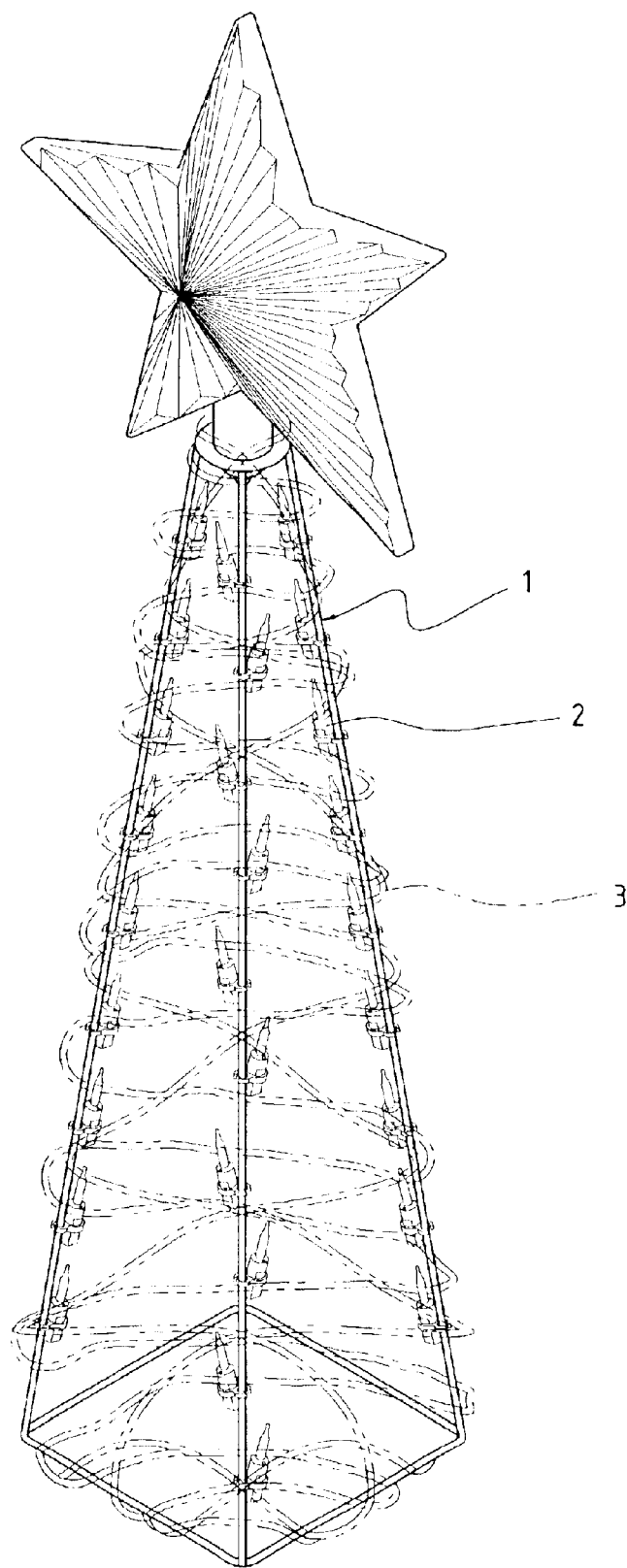
FIG. 3 shows the three-dimensional structure of the lighting fixture of this invention coated with a refracting layer.

Referring to FIGS. 2 and 3, according to a preferred embodiment of this invention, the structure of formative lighting fixtures is comprised of a frame (1), a plurality of bulbs (2), and a refracting layer (3).

The frame (1) is substantially a quadrangular tapered skeleton made by aggregating a plurality of rods. The plurality of bulbs (2) disposed scatteringly on the ribs of the frame (1) is the light source, and the refracting layer (3) is made of a transparent material and coated on the rods of the frame (1).

The refracting layer (3) could be either a transparent vitreous material or a plastic material, such as PVC or acrylic.

Moreover, the refracting layer (3) made of a transparent material is specifically tinted and patterned.

Figure 4:
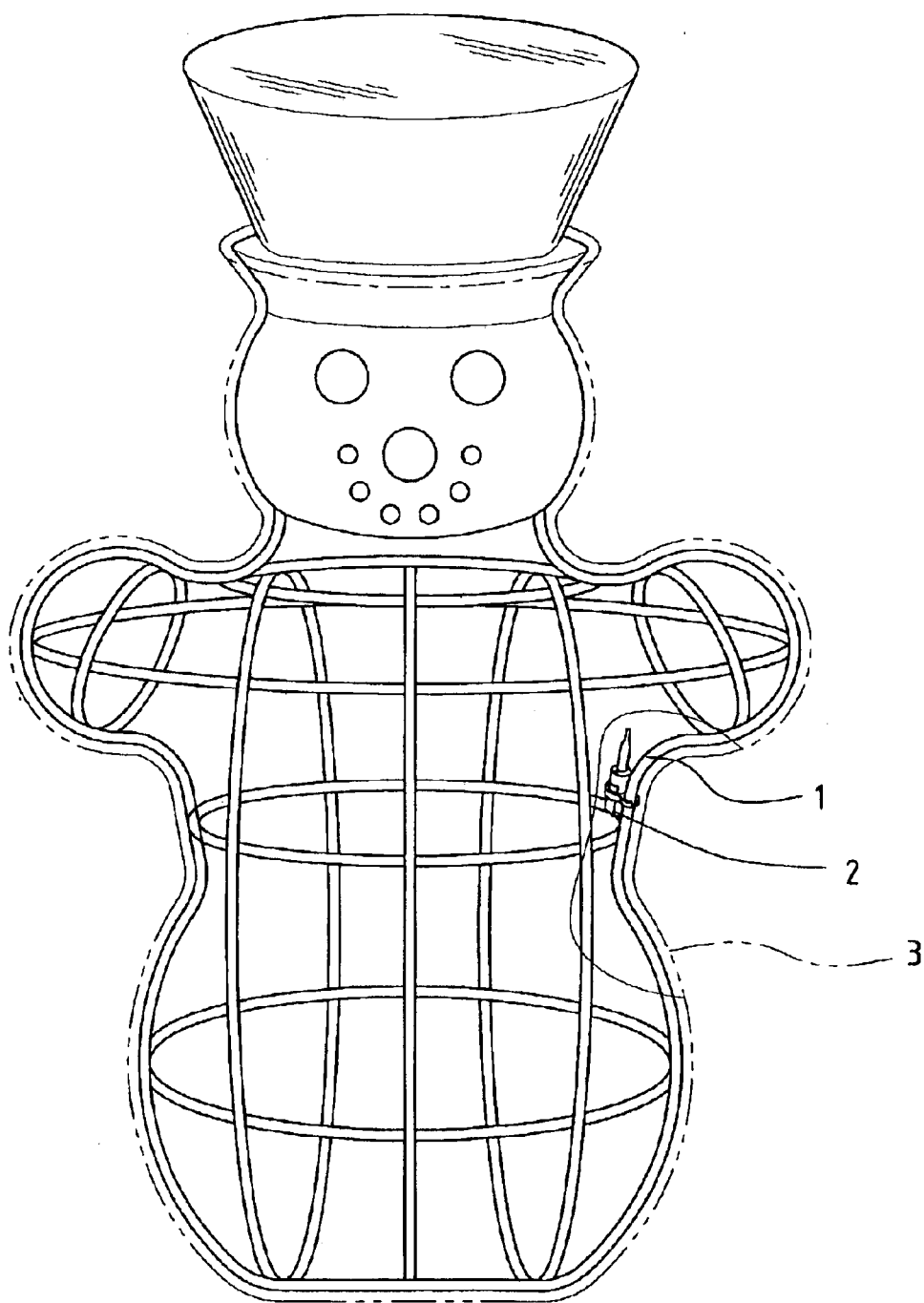
FIG. 4 shows the three-dimensional structure of the lighting fixture in another embodiment of this invention.
Figure 5:
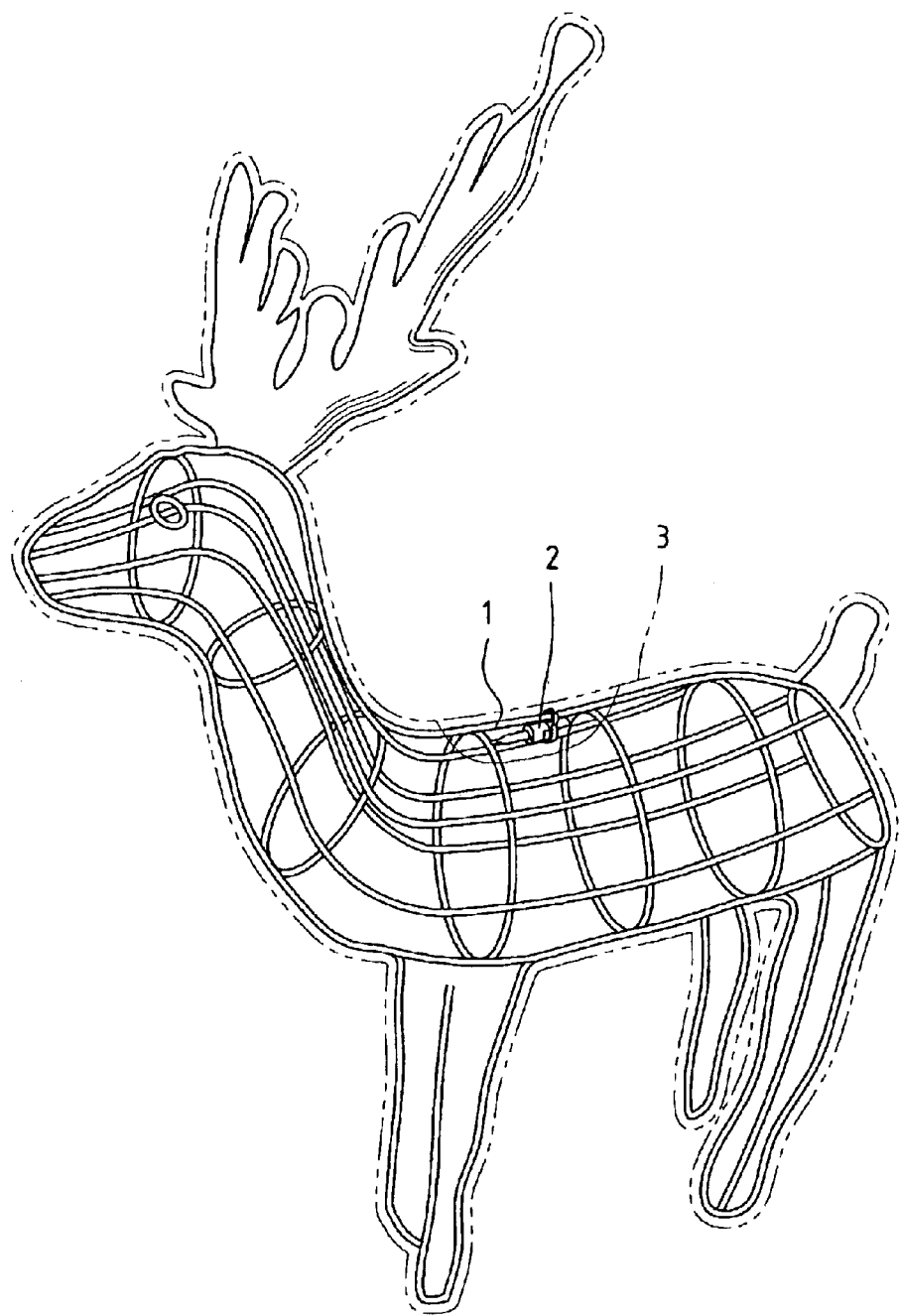
FIG. 5 shows the three-dimensional structure of the lighting fixture in yet another embodiment of this invention.

According to another embodiment of the structure of formative lighting fixtures of this invention shown in FIGS. 4 and 5, the frame (1) is profiled in a snowman or an elk by combining a plurality of mold-treated rods provided with a plurality of bulbs (2) and coated with a refracting layer (3).

The frame (1) of the structure of formative lighting fixtures of this invention is skeletonized and formed into a seasonable and timely formation, such as a Christmas tree, a snowman, or an elk, etc., with selected proper rod or rib material. Then, the bulbs are disposed on the skeleton of the frame (1), and finally, a suitable transparent material, glass, PVC, or acrylic for example, is fused and distributed scatteringly and randomly on the skeleton of the frame (1) in its thready state to thereby form the refracting layer (3) such that a dazzling phenomenon making the formative lighting fixtures more splendid and elegant is presented when light emitted from the bulbs penetrates into and refracted through the refracting layer (3).

In addition, in the case the transparent refracting layer is specifically tinted, the formative lighting fixtures would show off a more colorful and attractive scene. Further, a specific pattern, for example an ornament on a Christmas tree, a Santa Claus's dress, or the stripe or bell of an elk, could be added to the coated refracting layer (3) to enrich the variations of the formative lighting fixtures.

In the above described, at least one preferred embodiment has been described in detail with reference to the drawings annexed, and it is apparent that numerous changes or modifications may be made without departing from the true spirit and scope thereof, as set forth in the claims below.

What is claimed is:

1. A structure of formative lighting fixtures, comprising a frame and a plurality of bulbs, in which said frame is substantially a skeleton specifically profiled by gathering a plurality of rods; and said plurality of bulbs is a light source mounted on the skeleton of said frame, and the structure being characterized in that said frame is provided with a refracting layer which is a coating of a transparent material on the skeleton of said frame.

2. The structure according to claim 1, in which said refracting layer is made of a transparent plastic material, such as PVC or acrylic.

3. The structure according to claim 1, in which said refracting layer is made of a transparent vitreous material.

4. The structure according to claim 1, in which said refracting layer is made of a tinted transparent material.

* * * * *